(12) United States Patent
Wakamatsu

(10) Patent No.: US 9,609,218 B2
(45) Date of Patent: Mar. 28, 2017

(54) IMAGE-SHAKE CORRECTION APPARATUS AND CONTROL METHOD THEREOF

(71) Applicant: CANON KABUSHIKI KAISHA, Tokyo (JP)

(72) Inventor: Nobushige Wakamatsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/733,258

(22) Filed: Jun. 8, 2015

(65) Prior Publication Data

US 2015/0358545 A1   Dec. 10, 2015

(30) Foreign Application Priority Data

Jun. 10, 2014   (JP) .................................. 2014-119997

(51) Int. Cl.
| | |
|---|---|
| *H04N 5/217* | (2011.01) |
| *H04N 5/232* | (2006.01) |
| *G06T 5/00* | (2006.01) |
| *H04N 5/235* | (2006.01) |

(52) U.S. Cl.
CPC ......... *H04N 5/23254* (2013.01); *G06T 5/006* (2013.01); *H04N 5/2176* (2013.01); *H04N 5/2328* (2013.01); *H04N 5/23219* (2013.01); *H04N 5/23258* (2013.01); *H04N 5/235* (2013.01)

(58) Field of Classification Search
None
See application file for complete search history.

(56) References Cited

U.S. PATENT DOCUMENTS

| | | | | |
|---|---|---|---|---|
| 2001/0008418 A1* | 7/2001 | Yamanaka | ........... | H04N 5/3572 348/222.1 |
| 2011/0069762 A1* | 3/2011 | Yoshino | ................ | G06T 7/0026 375/240.16 |
| 2012/0162359 A1* | 6/2012 | Kendrick | ............. | H04N 5/3572 348/36 |

FOREIGN PATENT DOCUMENTS

JP   2006129175 A   5/2006

* cited by examiner

*Primary Examiner* — Mark T Monk
(74) *Attorney, Agent, or Firm* — Canon U.S.A., Inc. IP Division

(57) ABSTRACT

In an image-shake correction apparatus, if distortion is generated such that a screen peripheral portion of an image pickup screen of an image pickup element is reduced as compared with a screen center portion of the image pickup screen and if distortion is generated such that the screen center portion is reduced as compared with the screen peripheral portion, image-shake correction effect in the screen center portion is higher than image-shake correction effect in the screen peripheral portion.

6 Claims, 10 Drawing Sheets

FIG. 4A
FIG. 4B
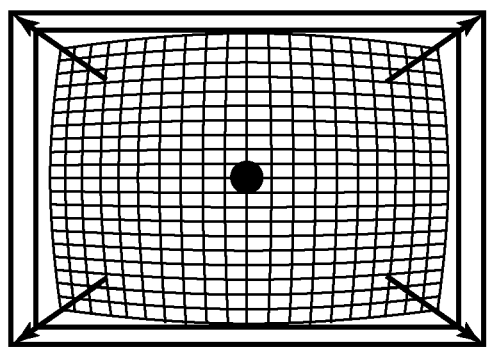
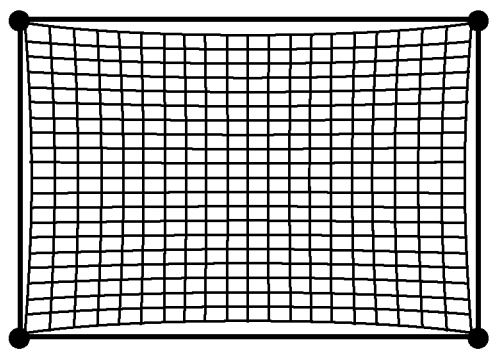

FIG. 5A
FIG. 5B
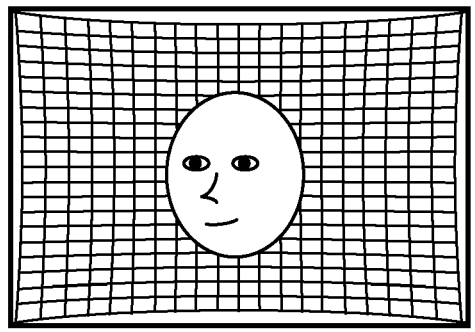
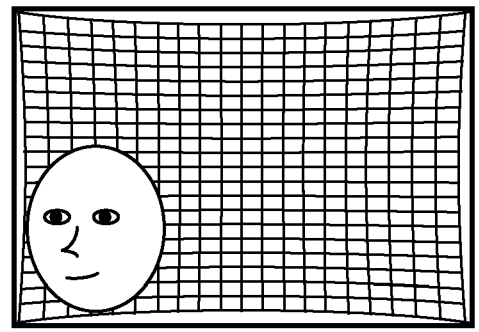

IMAGE-SHAKE CORRECTION APPARATUS AND CONTROL METHOD THEREOF

BACKGROUND OF THE INVENTION

Field of the Invention

The present invention relates to an image-shake correction apparatus having a function of correcting shake caused by camera shake or vibration, and also relates to a control method of the image-shake correction apparatus.

Description of the Related Art

In recent years, a zoom lens used in an image pickup device such as a compact digital camera may be a super wide-angle zoom lens. With such a zoom lens, the amount of distortion generated depending on the field angle is increased.

When optical design is made for a photographing lens unit, correction on distortion by the photographing lens unit may be reduced for simplifying optical design, and the distortion may be electronically corrected by digital image processing.

Also, a recent camera is equipped with an image-stabilization control device that prevents image shake due to camera shake etc. The image-stabilization control device is briefly described here. Camera shake is vibration with a frequency in a range from about 1 to about 10 Hz.

To allow photographing without image shake even if camera shake occurs when a shutter is released, vibration of camera due to camera shake needs to be detected and image-shake correction mechanism needs to be moved in accordance with the detected value.

At this time, it is required to accurately detect camera vibration and correct a change in optical axis due to the shake. Theoretically, image shake is restricted if a vibration detector that obtains a detection result such as an angular velocity and a drive controller that displaces a correction lens on the basis of the arithmetic processing result are mounted.

There are various optical image-stabilization mechanisms.

For example, there is an optical image-shake correction system that removes shake from an image focused on an image pickup element by moving a shift lens, which serves as a correcting unit for correcting image shake and which moves in a plane perpendicular to the optical axis, by an image-shake correction amount.

Also, there are an image-pickup-element image-shake correction system that removes shake from an image by moving an image pickup element, which serves as a correcting unit for correcting image shake and which moves in a plane perpendicular to the optical axis; and a variable prism image-shake correction system that uses a variable prism the transmission deflection angle of which is variable.

Either system may be a subject of the present invention. Hence, a configuration of an optical image-shake correction system is representatively described below.

An image pickup device including the optical image-shake correction system performs image-shake correction by instructing a shift lens driver for movement by an image-shake correction amount calculated from a detection signal from a vibration detector, and driving the shift lens as a control subject to a target value.

Japanese Patent Laid-Open No. 2006-129175 discloses an image pickup device in which distortion correction and an optical image-stabilization mechanism are combined, so that enlargement and reduction in a peripheral edge portion of an image caused by optical aberration of a lens group are prevented from occurring.

With this method, if an optical image-stabilization mechanism is provided and an image pickup optical system having optical distortion remaining therein is provided, degradation in image quality caused by distortion in a peripheral portion can be reduced.

In an image pickup device including an image pickup optical system whose distortion changes in a barrel shape or a pincushion shape depending on zoom magnification, not only the lateral magnification in a peripheral portion of an image but also the lateral magnification in a center portion of the image may noticeably change.

Distortion can be corrected in accordance with characteristics previously set by lens characteristics after an image is acquired by an image pickup device. If a lens has barrel-shaped distortion as shown in FIG. 4A, a peripheral portion of an image may be reduced as compared with a center portion, and therefore the image is corrected to enlarge the peripheral portion.

Also, if a lens has pincushion-shaped distortion as shown in FIG. 4B, a center portion of an image may be reduced as compared with a peripheral portion, and therefore the image is corrected to enlarge the center portion.

However, in an optical image-stabilization mechanism built in an image pickup optical system, optical image stabilization has to be performed in image pickup optical characteristics having optical distortion remaining therein. Hence, it is difficult to properly provide optical image stabilizing effect in all region of an image.

Particularly in a general photographing scene, the resolution in a center portion of an image is emphasized the most in many cases. However, in normal optical image stabilization, correction is made to decrease shake in the entire image.

For example, in the case of an optical system having barrel-shaped distortion as shown in FIG. 4B, although image stabilization effect in a peripheral portion of an image is proper, image stabilization effect in a center portion of the image may become weak due to the influence of a change in lateral magnification in a portion near the center.

Also, there may be a scene in which a main object is not located in a portion near the center of an image. For example, the position at which a user sets an area where a main object is present or the position of a main object such as a face detected by a method such as shape analysis from image data may be largely separated from the center of an image.

In this case, the image stabilization effect at the object position should be emphasized the most. However, the shake correction effect may vary depending on the characteristics of distortion at the object position.

The present invention provides an image pickup device and an image stabilization control device that can provide stable camera shake correction effect in an image region that requires shake correction the most in an image pickup optical system having optical distortion remaining therein.

SUMMARY OF THE INVENTION

According to an aspect of the invention, there is provided an image-shake correction apparatus including a calculating unit configured to calculate a shake correction amount on the basis of an output of a shake detecting unit; and a control unit configured to control an image-shake correction unit configured to correct image shake in accordance with the shake correction amount. If distortion is generated such that a screen peripheral portion of an image pickup screen of an image pickup element is reduced as compared with a screen center portion of the image pickup screen and if distortion is generated such that the screen center portion is reduced as compared with the screen peripheral portion, image-shake correction effect in the screen center portion is higher than image-shake correction effect in the screen peripheral portion.

Further features of the present invention will become apparent from the following description of exemplary embodiments with reference to the attached drawings.

BRIEF DESCRIPTION OF THE DRAWINGS

FIGS. 4A and 4B are illustrations schematically explaining images with distortion.

FIGS. 5A and 5B are illustrations schematically explaining images with distortion and object positions.

DESCRIPTION OF THE EMBODIMENTS

Embodiments of the invention are described below.

First Embodiment

An embodiment of the invention is described below with reference to the drawings.
Description for Block Diagram of Image Pickup Device FIG. 1 is a block diagram showing a configuration of an image pickup device having an image-shake correction function according to this embodiment of the invention.

Figure 1:
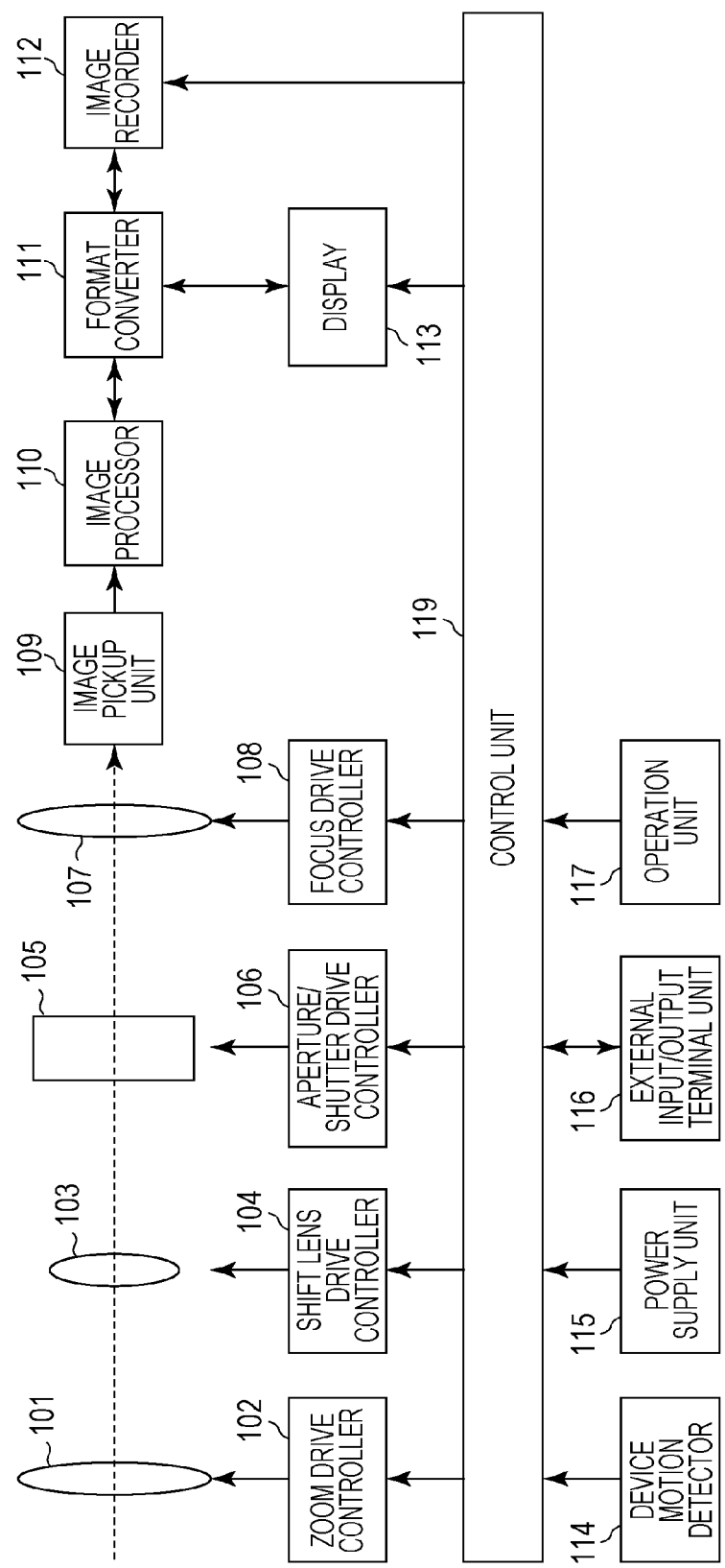
FIG. 1 is a block diagram showing a configuration of an image pickup device according to a first embodiment of the invention.

In FIG. 1, a zoom unit 101 includes a zoom lens that changes the magnification. A zoom drive controller 102 controls driving of the zoom unit 101.

A shift lens 103 serves as a shake correction optical system that can change the position thereof in a plane substantially perpendicular to the optical axis. A shift lens drive controller 104 controls driving of the shift lens 103. An aperture/shutter unit 105 is also provided. An aperture/shutter drive controller 106 controls driving of the aperture/shutter unit 105.

A focus unit 107 includes a lens for focus adjustment. A focus drive controller 108 controls driving of the focus unit 107.

In an image pickup unit 109 that receives an optical image passing through an image pickup optical system, an image pickup element receives light being incident through respective lens units and outputs information about an electric charge corresponding to the light quantity of the light as analog image data to an image processor 110.

The image processor 110 applies image processing such as distortion correction to digital image data output through A/D conversion, and outputs digital image data after the application. The image processing performed by the image processor 110 includes white balance adjustment and color interpolation processing in addition to the distortion correction.

A display 113 may be a small-size liquid crystal display (LCD), and displays the digital image data output from the image processor 110.

A format converter 111 converts the digital image data as an output signal output from the image processor 110 into a recording format such as JPEG, and outputs the converted data to an image recorder 112. The image recorder 112 records the digital image data converted by the format converter 111 on a recording medium such as a nonvolatile memory.

A device motion detector 114 has, for example, a gyro sensor that detects the angular speed of the device. The device motion detector 114 is provided for driving the shift lens 103 on the basis of the detected output signal and hence performing image stabilization control.

A power supply unit 115 supplies power to the entire system depending on the purpose of use. An external input/output terminal unit 116 inputs and outputs a communication signal and an image signal between this device and an external device. An operation unit 117 is for operating the system. A control unit 119 controls the entire system.
Description for Operation of Image Pickup Device An operation of the image pickup device having the above-described configuration is described.

The operation unit 117 has a shutter release button configured such that a first switch (SW1) and a second switch (SW2) are sequentially turned ON in accordance with a depression amount.

The shutter release button is configured such that the first switch is turned ON when the shutter release button is depressed by about half, and the second switch is turned ON when the shutter release button is depressed completely.

When the first switch of the operation unit 117 is turned ON, the focus drive controller 108 drives the focus unit 107 to perform focus adjustment, and the aperture/shutter drive controller 106 drives the aperture/shutter unit 105 to set a proper exposure amount.

Further, when the second switch is turned ON, image data obtained from an optical image exposed by the image pickup unit 109 is stored in the image recorder 112 through the image processor 110 and the format converter 111.

At this time, if an instruction for turning ON a shake correction function is given by the operation unit 117, the control unit 119 gives an instruction for a shake correction operation to the shift lens drive controller 104, and the shift lens drive controller 104 which has received the instruction performs the shake correction operation until an instruction for turning OFF the shake correction function is given.

Also, if the operation unit 117 is not operated for a predetermined period, the control unit 119 gives an instruction for shutting off the power supply to the display for power saving.

If an instruction for changing the magnification by the zoom lens is given to the operation unit 117, the zoom drive controller 102 which has received the instruction through the control unit 119 drives the zoom unit 101 and moves the zoom lens to the instructed zoom position.

Also, the focus drive controller 108 drives the focus unit 107 for focus adjustment on the basis of image information sent from the image pickup unit 109 and processed by the image processor 110 and the format converter 111.

Figure 2:
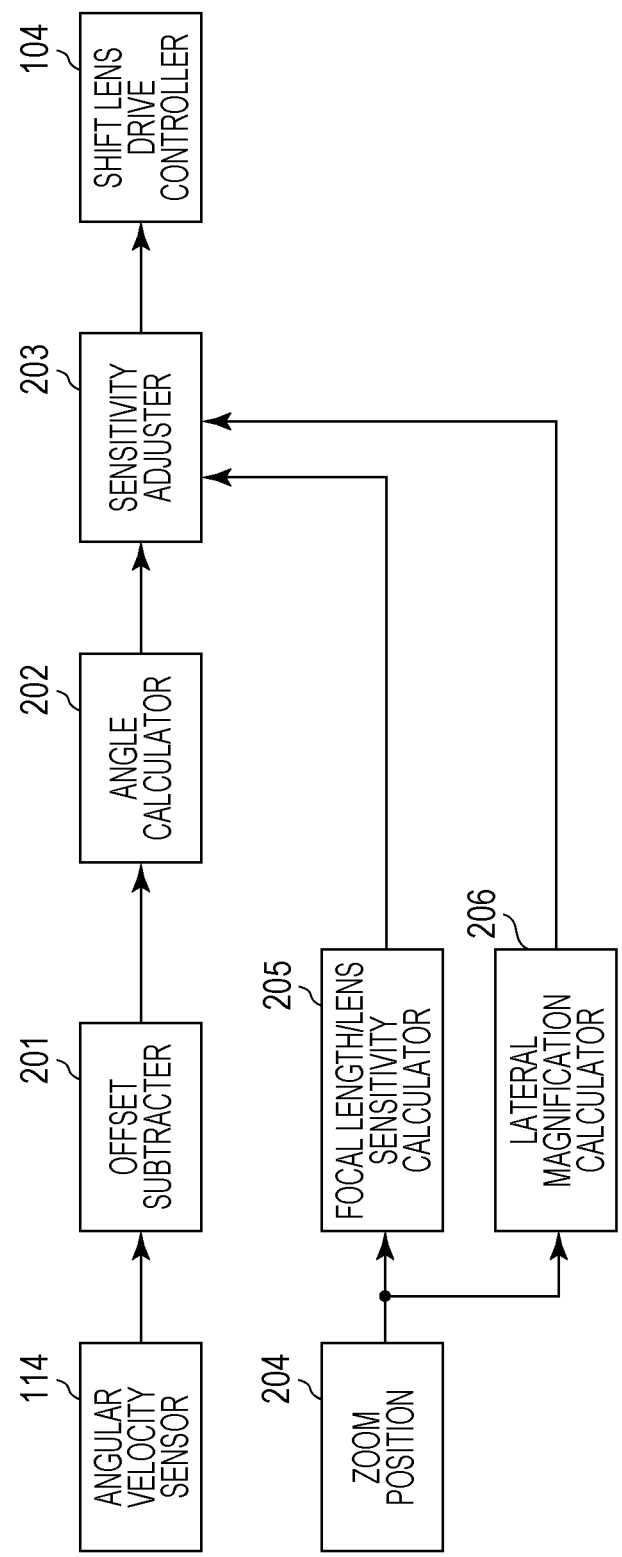
FIG. 2 is a block diagram showing an image stabilization control device according to the first embodiment of the invention.

Description for Block Diagram Showing Configuration of Image-shake Correction Processing FIG. 2 is a block diagram showing the shift lens drive controller 104 and the device motion detector 114 shown in FIG. 1, and a configuration of image-shake correction processing that is executed in the control unit 119.

The device motion detector 114 uses an angular velocity sensor (hereinafter, the device motion detector 114 may be occasionally referred to as the angular velocity sensor 114), and serves as an angular velocity detecting unit that detects shake angles around the pitch and yaw. The output of the angular velocity sensor 114 is used for subtracting an offset component that is added as a detection noise to the angular velocity sensor in an offset subtracter 201.

For example, a DC component is cut by a high-pass filter (HPF). The angular speed after the offset is subtracted is integrated and converted into an angle signal by an angle calculator 202. The output of the angle calculator 202 is input to a sensitivity adjuster 203.

The sensitivity adjuster 203 amplifies the output of the angle calculator 202 on the basis of the focal length, the lens sensitivity, and the lateral magnification obtained from zoom position 204, and the amplified output serves as a shake correction target value. The shake correction target value is provided to correct a change in shake correction sensitivity in a camera image plane for a shake correction stroke of the shift lens drive controller 104, due to a change in optical information of the lens.

The shake correction target value obtained by the sensitivity adjuster 203 is output to the shift lens drive controller 104 to cause the shift lens drive controller 104 to perform shake correction and hence to perform image-shake correction.

Block Diagram Showing Details of Feedback Controller

Figure 3:
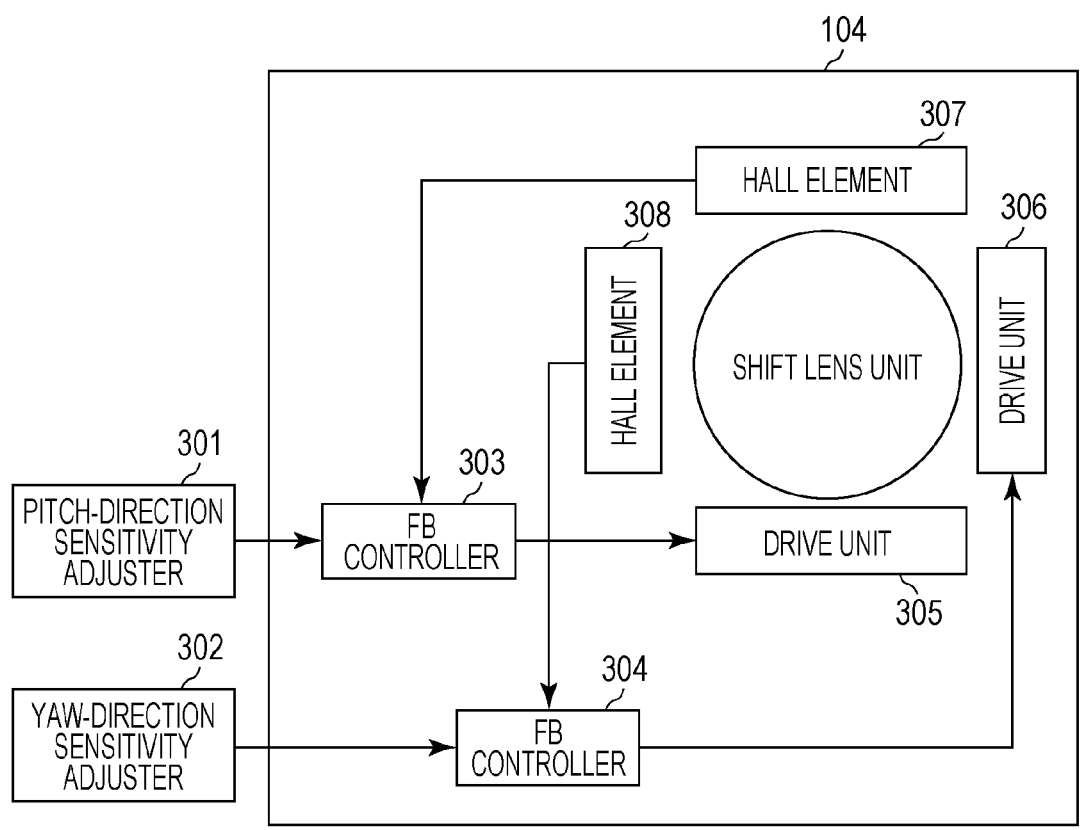
FIG. 3 is a block diagram showing a feedback controller and a configuration of its periphery according to the first embodiment of the invention.

FIG. 3 is a block diagram showing details of a feedback controller included in an inner configuration of the shift lens drive controller 104 shown in FIG. 2.

Position control for the shift lens 103 by the shift lens drive controller 104 is described. In the position control for the shift lens 103, the shift lens 103 is driven to a position corresponding to a shift lens moving amount calculated on the basis of the output of the angular velocity sensor 114.

A magnet is attached to the shift lens 103. Hall elements 307 and 308 detect the magnetic field of this magnet. Position signals indicative of the actual position of the shift lens 103 are respectively transmitted to lens feedback units 303 and 304.

The lens feedback units 303 and 304 perform feedback control such that these position signals are converged to correction-position control signals sent from sensitivity adjusters 301 and 302. The drive units 305, 306 are driving means moving shift lens 103 in the optical axis orthogonal direction.

The position signals output from the hall elements 307 and 308 have individual variations. Hence, the outputs of the hall elements 307 and 308 have to be adjusted so that the shift lens 103 is moved to a predetermined position with respect to a predetermined correction position control signal.

The above-described configuration is an overview configuration of shake correction.

Description for Method of Calculating Shake Correction Amount

A method of calculating a shake correction amount by the sensitivity adjuster 203 is described below in detail.

A shake δ that occurs at an image pickup plane is obtained by Expression (1) as follows from the camera shake (shake angle θ) of the image pickup optical system and the focal length f of the image pickup optical system.

$$\delta = f \times \theta \qquad (1)$$

In this case, f is obtained from the focal length obtained from the zoom position of the image pickup optical system, and the shake angle θ is obtained from the angular velocity sensor. The shake correction can be performed by driving the shake correction lens to correct the shake δ occurring at the image pickup plane and performing the image-shake correction in accordance with the information.

When Ts represents a shift lens sensitivity (image plane moving amount with respect to shift lens movement), the shift lens moving amount ∂ for the shake correction can be obtained by Expression (2).

$$\partial = f \times \theta \div Ts \qquad (2)$$

If distortion is increased depending on the zoom position as described above, the following problem may arise.

If distortion is too large, the shake amount to be corrected at the center markedly differs from the shake amount to be corrected in an image edge region.

In a case of barrel-shaped distortion as shown in FIG. 4A, the image-stabilization control can be properly performed at the center by the shift lens moving amount obtained by Expression (2).

However, in a region near the image edge, the magnification is changed by the distortion. Hence, if the image-stabilization control is performed directly with Expression (2), correction may be over correction.

Also, in a case of pincushion-shaped distortion as shown in FIG. 4B, the image-stabilization control can be properly performed at the region near the image edge by the shift lens moving amount obtained by Expression (2).

However, in a region near the image center, the lateral magnification is changed by the distortion. Hence, if the image-stabilization control is performed directly with Expression (2), correction may be over correction.

In a photographed image, the resolution at the image center may be mainly emphasized in many cases.

Hence, image-stabilization control is performed such that the image-stabilization effect in the region near the image center is increased by calculating the shift lens moving amount ∂ with regard to the lateral magnification in the region near the image center.

The shift lens moving amount ∂ for the shake correction with regard to a lateral magnification γ as a gain in a region near the image center as described above is obtained by Expression (3).

$$\partial = f \times \theta \times \gamma \div Ts \qquad (3)$$

As described above, since the position signals output from hall elements 209 and 210 of the shift lens drive controller 104, the hall elements 209 and 210 which detect the actual position of the shift lens 103, have individual variations, the output adjustment is required to be performed.

In this case, if the output adjustment for the halls is performed at a telephoto end, a lateral magnification γ at each zoom position is prepared with reference to the lateral magnification in a portion near the center at the telephoto end.

A case in which distortion at a zoom wide end has barrel-shaped characteristics as shown in FIG. 4A, and a case in which distortion at the zoom telephoto end has pincushion-shaped characteristics as shown in FIG. 4B.

In this case, since the lateral magnification at the telephoto end is considered as the reference, the lateral magnification at the telephoto end is 1, and the lateral magnification at the wide end becomes a value larger than 1.

In this way, the lateral magnification γ is previously obtained with reference to the zoom position at which the position signal for detecting the shift lens position is adjusted. When the camera is operated, the shift lens moving amount ∂ as indicated by Expression (3) is calculated in accordance with the lateral magnification γ serving as a gain corresponding to each zoom position.

That is, the gain of a shake correction amount if distortion that a screen peripheral portion of an image pickup screen is reduced as compared with a screen center portion is larger than the gain of a shake correction amount if distortion that the screen center portion of the image pickup screen is reduced as compared with the screen peripheral portion.

Figure 9:
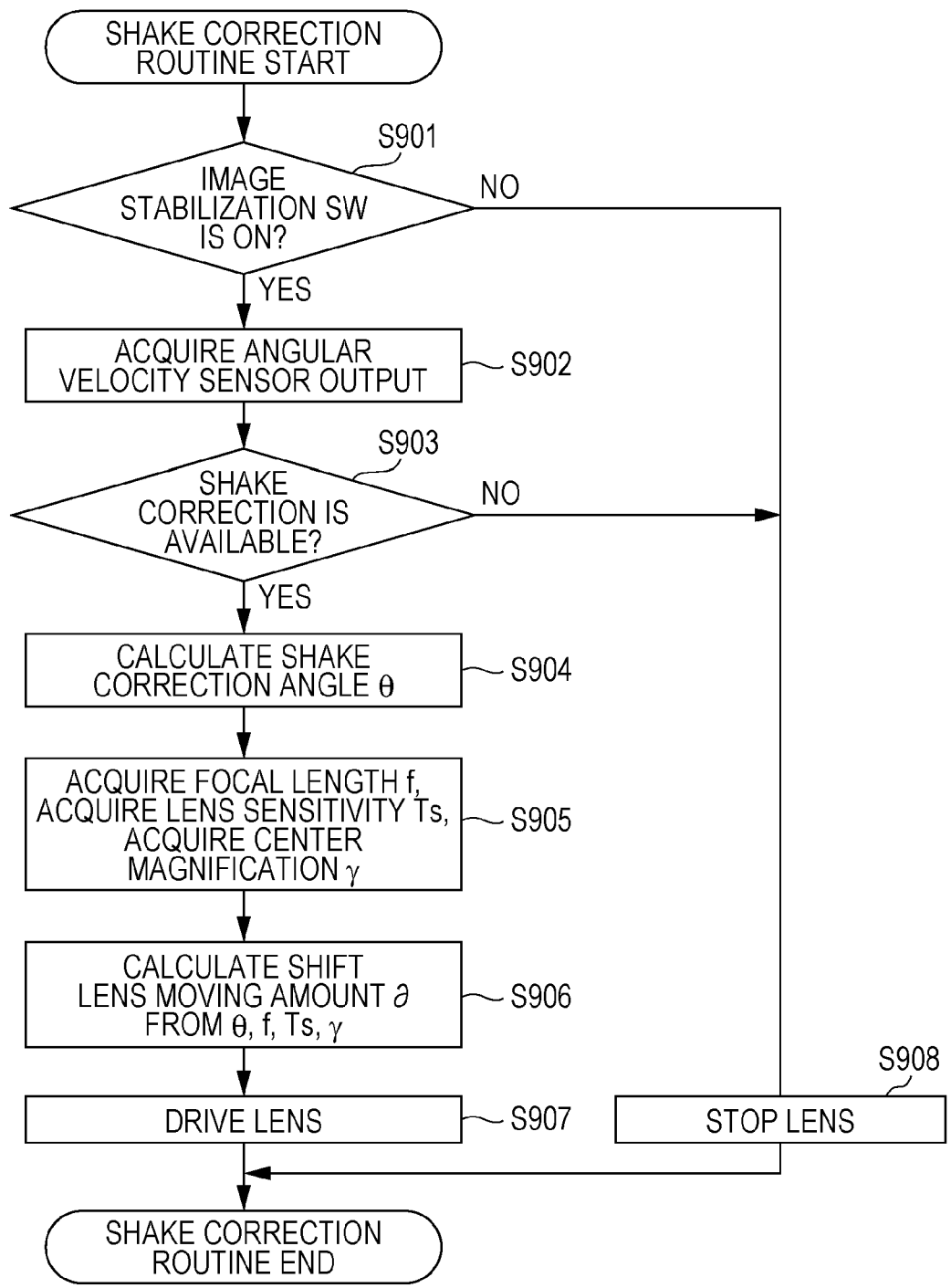
FIG. 9 is a flowchart showing an initialization operation according to the first embodiment of the invention.

The shake correction operation according to the first embodiment of the invention is described with reference to the flowchart in FIG. 9. This flow is started when a main power supply of a camera is turned ON, and is executed every predetermined sampling period.

In step S901, the state of an image-stabilization SW is detected. If ON, the processing goes to step S902, and if OFF, the processing goes to step S908.

In step S902, the output of the angular velocity sensor 114 is acquired.

In step S903, it is judged whether shake correction is available or not. If the shake correction is available, the processing goes to step S904. If the shake correction is not available, the processing goes to step S908.

It is assumed that the judgment in step S903 is that the shake correction is not available from when the power is supplied to when the output of the angular velocity sensor 114 becomes stable.

It is judged that the shake correction is available after the output of the angular velocity sensor 114 becomes stable. The judgment is provided to prevent degradation in image-shake correction performance (image stabilization performance) by performing the shake correction when the output value is not stable immediately after the power is supplied.

In step S904, the offset subtracter 201 and the angle calculator 202 in the control block diagram in FIG. 2 calculate the shake correction angle θ and the processing goes to step S905.

Then, in step S905, the focal length/lens sensitivity calculator 205 shown in the control block diagram in FIG. 2 acquires the focal length f and the lens sensitivity Ts from current zoom position information.

Then, the lateral magnification calculator 206 acquires the lateral magnification γ at the image center previously stored for each zoom position, and the processing goes to step S906.

The calculation of the lateral magnification γ is described. As described above, if the output of the shift lens position detection is adjusted at the telephoto end, the lateral magnification γ at each zoom position is prepared with reference to the lateral magnification in a portion near the center at the telephoto end.

A case in which distortion at the zoom wide end has barrel-shaped characteristics as shown in FIG. 4A, and a case in which distortion at the zoom telephoto end has pincushion-shaped characteristics as shown in FIG. 4B.

In this case, since the lateral magnification of the image center at the telephoto end is considered as the reference, the lateral magnification at the telephoto end is 1, and the lateral magnification at the wide end becomes a value larger than 1.

In step S906, a shift lens moving amount ∂ is obtained from the angle θ obtained in step S904; and the focal length f, the lens sensitivity Ts, and the lateral magnification γ obtained in step S905.

The sensitivity adjuster 203 in the control block diagram in FIG. 2 obtains the shift lens moving amount ∂ for the shake correction by Expression (3), and the processing goes to step S907.

In step S907, the shift lens drive controller 104 in the control block diagram in FIG. 2 drives the shift lens on the basis of the shift lens moving amount ∂ obtained in step S906. The shake correction routine is ended and the processing waits for the next sampling period.

In step S908, the driving of the shake correction lens is stopped, and the shake correction lens is fixed at the optical-axis center. The shake correction routine is ended, and the processing waits for the next sampling period.

That is, in this embodiment, if there is distortion that a screen peripheral portion in an image pickup screen is reduced as compared with a screen center portion, and if there is distortion that the screen center portion in the image pickup screen is reduced as compared with the screen peripheral portion, the image-shake correction effect in the screen center portion is set to be higher than the image-shake correction effect in the screen peripheral portion.

As described above, by changing the correction amount of optical image stabilization in accordance with the lateral magnification in the portion near the image center, the stable camera-shake correction effect can be obtained in the portion near the image center where shake correction is required the most in the photographed image.

Second Embodiment

According to the first embodiment, in many cases, the method of optimizing the image-shake correction effect (image stabilization effect) in a portion near the image center at which the resolution is emphasized the most has been described.

However, in some photographing scenes, there is a situation in which the resolution is emphasized not at the image center, but at a position separated from the center of a photographed image. For example, when a person is photographed as a main object, the person may not be always photographed while located in a portion near the center. Other object may be in the same situation.

For example, as shown in FIG. 5A, when the face of a person that is a main object is located in a portion near the center of an image to be photographed, if it is desirable to optimize the image stabilization effect in the portion near the face, the image stabilization control may be performed with regard to the lateral magnification in the portion near the center.

However, as shown in FIG. 5B, if the face as a main object is located in a portion near an edge of an image, the lateral magnification in a region where the face is located differs from the lateral magnification in the portion near the image center.

If the image stabilization control is performed by Expression (3) using the lateral magnification in the portion near the center, the image stabilization effect at the face position may be decreased.

Hence, described below according to the second embodiment is a method of optimizing the most the image-shake correction effect (image stabilization effect) in a region where a main object is located, by changing the lateral magnification for calculating the shift lens moving amount ∂ depending on the main-object position in a photographed image.

Figure 6:
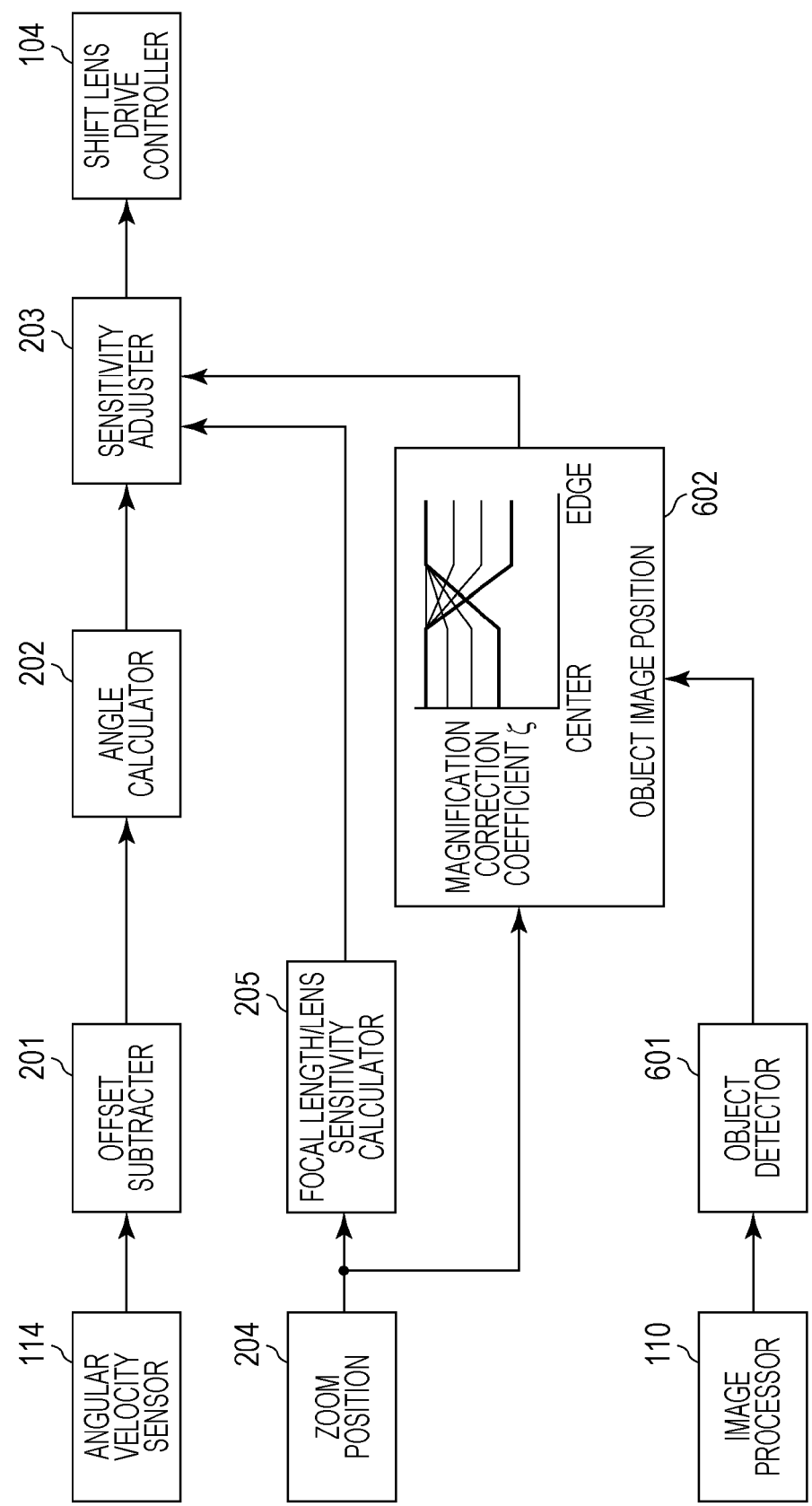
FIG. 6 is a block diagram showing a configuration of an image pickup device according to a second embodiment of the invention.

FIG. 6 is a block diagram showing the shift lens drive controller 104 and the device motion detector 114 shown in FIG. 1, and a configuration of image-shake correction processing according to the second embodiment that is executed in the control unit 119.

Similarly to the processing in FIG. 2 according to the first embodiment, the angular velocity sensor 114 calculates the angle, and the sensitivity adjuster 203 calculates a shift lens moving amount using the focal length, the lens sensitivity, and the lateral magnification from the zoom position. However, the second embodiment differs from the first embodiment in the following point.

The sensitivity adjuster 203 receives an output of a magnification correction coefficient calculator 602. The magnification correction coefficient calculator 602 receives the zoom position 204 and an output of an object detector 601, and outputs a magnification correction coefficient to the sensitivity adjuster 203 in accordance with the result of the object detector 601.

The object detector 601 receives an output of the image processor 110, and detects an object.

A shake correction operation according to the second embodiment of the invention is described with reference to the flowchart in FIG. 7. This flow is started when a main power supply of a camera is turned ON, and is executed every predetermined sampling period.

In step S701, the state of the image-stabilization SW is detected. If ON, the processing goes to step S702, and if OFF, the processing goes to step S714.

In step S702, the output of the angular velocity sensor 114 is acquired.

In step S703, it is judged whether shake correction is available or not. If the shake correction is available, the processing goes to step S704. If the shake correction is not available, the processing goes to step S714.

It is assumed that the judgment in step S703 is that the shake correction is not available from when the power is supplied to when the output of the angular velocity sensor 114 becomes stable.

It is judged that the shake correction is available after the output of the angular velocity sensor 114 becomes stable. The judgment is provided to prevent degradation in image stabilization performance by performing the shake correction when the output value is not stable immediately after the power is supplied.

In step S704, the offset subtracter 201 and the angle calculator 202 shown in the control block diagram in FIG. 6 calculate the shake correction angle θ and the processing goes to step S705.

In step S705, the focal length/lens sensitivity calculator 205 in the control block diagram in FIG. 6 acquires a focal length f and a lens sensitivity Is from current zoom position information.

Then, the lateral magnification calculator 206 acquires a lateral magnification γ at the image center previously stored for each zoom position, and the processing goes to step S706.

In step S706, the object detector 601 detects a main object from the output of the image processor 110 in the control block diagram in FIG. 6.

For the object detecting method, since there has been an image pickup device having an automatic exposure function of automatically determining exposure with regard to the entire screen, with such an image pickup device, the device causes a user to instruct an area where a main object is present.

Then, there has been a method of adjusting the exposure in accordance with the instructed area, and a method of automatically detecting a face as a main object by a method of shape analysis or the like from image data obtained by an image pickup element and hence performing exposure control so that the detected face has proper exposure.

The position of the main object in the image can be obtained by any of the above-described methods.

In step S707, it is judged whether the main object is detected or not in step S706. If the main object is detected, the processing goes to step S708. If the main object is not detected, the processing goes to step S711.

If the main object is detected in step S707, the center position of the main object detected in step S706 is acquired in step S708, and the processing goes to step S709. In step S709, an absolute value α of the main-object position when the image center is assumed as 0 is calculated, and the processing goes to step S710.

In step S710, the magnification correction coefficient calculator 602 in the control block diagram in FIG. 6 calculates a magnification correction coefficient ζ from the zoom position information and the main-object center-position absolute value α, and the processing goes to step S712.

The calculation of the magnification correction coefficient ζ is described. As described above, if the output of the shift lens position detection is adjusted at the telephoto end, the lateral magnification γ serving as a gain at each zoom position is prepared with reference to the lateral magnification in a portion near the center at the telephoto end.

A case in which distortion at the zoom wide end has barrel-shaped characteristics as shown in FIG. 4A, and a case in which distortion at the zoom telephoto end has pincushion-shaped characteristics as shown in FIG. 4B.

In this case, since the lateral magnification of the image center at the telephoto end is considered as the reference, the lateral magnification at the telephoto end is 1, and the lateral magnification at the wide end becomes a value larger than 1.

When the main-object position is the center, the magnification correction coefficient ζ is set to be equivalent to the lateral magnification γ.

However, in the case of the zoom lens at the telephoto end, if the object is separated from the center and located in a portion near an image edge, the magnification correction coefficient ζ is set at a larger value than the lateral magnification γ at the center to correspond to the lateral magnification in the portion near the image edge.

Also, in the case of the zoom lens at the wide end, if the object is separated from the center and located in a portion near an image edge, the magnification correction coefficient ζ is set at a smaller value than the lateral magnification γ at the center to correspond to the lateral magnification in the portion near the image edge.

In this way, the magnification correction coefficient ζ being the lateral magnification at the object position (with reference to the lateral magnification at the optical-axis center at the telephoto end) is calculated in accordance with the zoom position and the object image position.

If the main object is not detected in step S707, the magnification correction coefficient ζ is calculated in step S711; however, ζ takes the value of γ without change in step S711, and the processing goes to step S712.

In step S712, a shift lens moving amount ∂ is obtained from the angle θ obtained in step S704; the focal length f, and the lens sensitivity Is obtained in step S705; and the magnification correction coefficient ζ serving as the gain obtained in step S710 or step S711.

The sensitivity adjuster 203 in the control block diagram in FIG. 6 obtains the shift lens moving amount ∂ for the shake correction by Expression (4), and the processing goes to step S713.

$$\partial = f \times \partial + Ts \quad (4)$$

In step S713, the shift lens drive controller 104 in the control block diagram in FIG. 6 drives the shift lens on the basis of the shift lens moving amount ∂ obtained in step S712. The shake correction routine is ended and the processing waits for the next sampling period.

In step S714, the driving of the shake correction lens is stopped, and the shake correction lens is fixed at the optical-axis center. The shake correction routine is ended, and the processing waits for the next sampling period.

As described above, the gain of a shake correction amount if the lateral magnification at the position of a main object in an image pickup screen is larger than a predetermined value is set to be larger than the gain of a shake correction amount if the lateral magnification at the position of the main object in the image pickup screen is smaller than the predetermined value.

That is, if there is distortion that a screen peripheral portion is reduced as compared with a screen center portion, and if there is distortion that the screen center portion is reduced as compared with the screen peripheral portion, the image-shake correction effect in the portion of a main object is set to be higher than the image-shake correction effect at a position other than the position of the main object.

As described above, when a main object is located in a portion near the image center, the correction amount of optical image stabilization is calculated in accordance with the lateral magnification in the portion near the image center.

If the main object is not located in the portion near the image center, the lateral magnification (lateral magnification correction coefficient) is changed in accordance with the position of the main object, and the correction amount of optical image stabilization is calculated. Accordingly, stable camera-shake correction effect is obtained at the position of the main object in the photographed image.

Third Embodiment

In the above-described second embodiment, the method of optimizing the image stabilization effect at the object position has been described.

However, for example, when a face is detected as a main object and it is desired to obtain proper image stabilization effect for the entire region of the face, image-shake correction effect (image stabilization effect) may vary in the entire face region depending on the size of the face even if the object center position is the same.

Figure 8A:
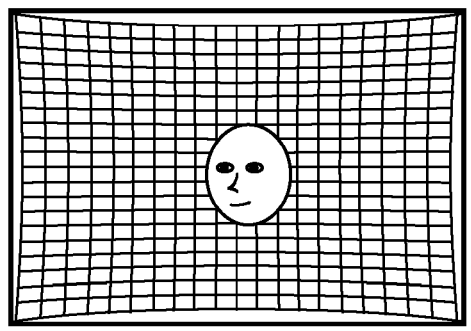
FIGS. 8A and 8B are illustrations schematically explaining images indicating distortion, and object positions and sizes according to a third embodiment of the invention.
Figure 8B:
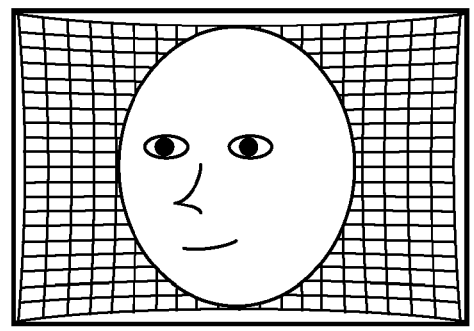

For example, in FIGS. 8A and 8B, the center positions of the faces of persons being main objects are located at the center positions in images; however, the sizes of the faces in the images are different.

In FIG. 8A, the face with the size is arranged in a portion near the image center, optimal image stabilization effect can be obtained by the method described according to the second embodiment of setting the correction amount in accordance with the lateral magnification in the portion near the image center.

However, in FIG. 8B, since the face with the size covers a wide range in an image region, the lateral magnification may vary depending on the position of the face.

At this time, if the correction amount is set by using the average value of lateral magnifications in the face region, the average correction effect can be obtained in the entire face.

Hence, in the third embodiment, the magnification correction coefficient ζ is calculated in accordance with the object position and the object size.

In particular, a face region may be extracted, and a correction amount may be calculated while an average lateral magnification in the face region serves as a magnification correction coefficient ζ.

Also, if the face size is larger than a predetermined size, a magnification correction coefficient ζ (assuming ζ=γ) may be calculated so as to obtain proper image stabilization effect in the entire screen and the correction amount may be calculated.

With any of the methods, image-shake correction effect (image stabilization effect) in the entire face can be optimized as compared with the case in which the lateral magnification at the center value of the object is used.

Figure 10:
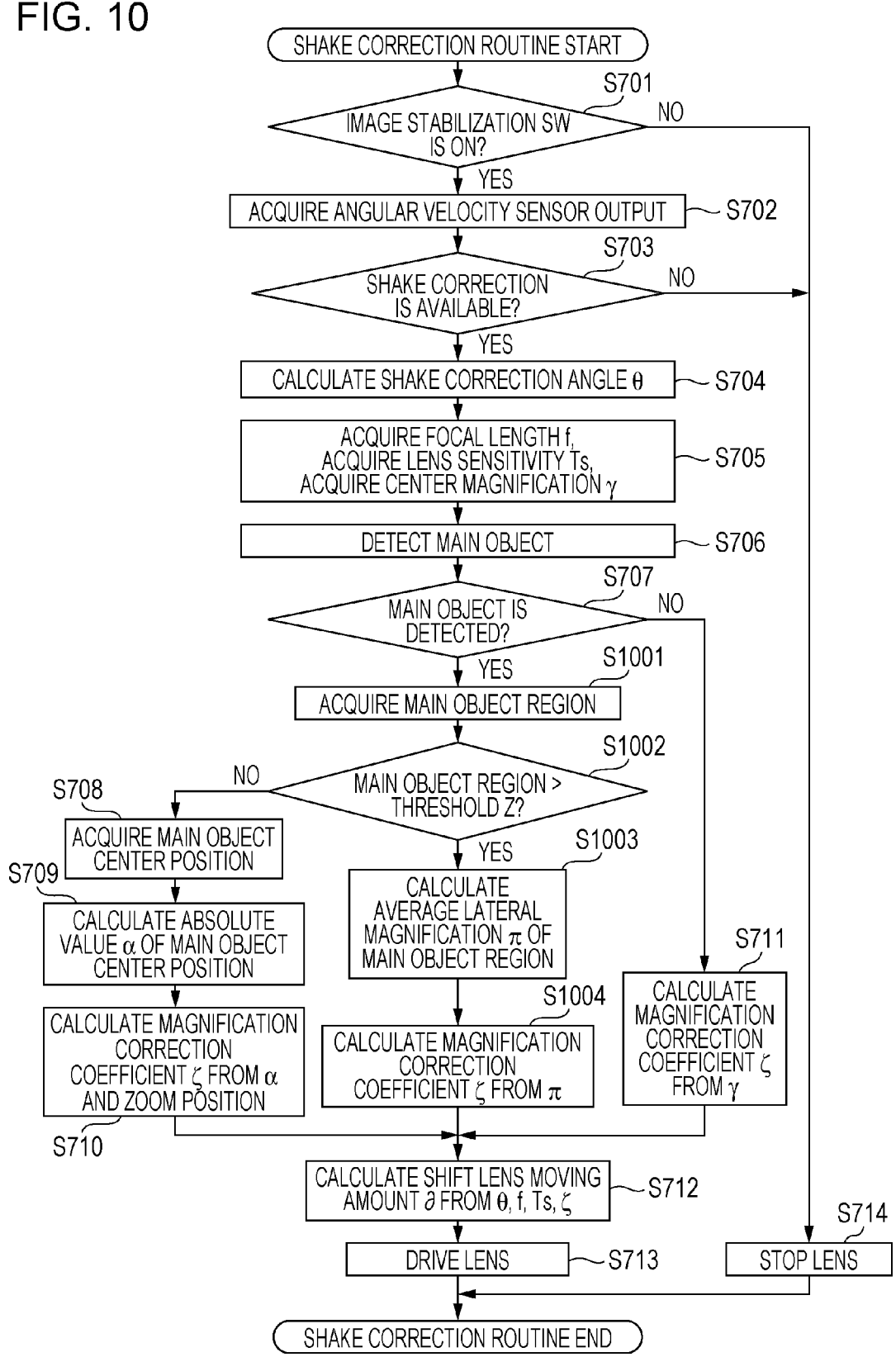
FIG. 10 is a flowchart showing an initialization operation according to the third embodiment of the invention.

A shake correction operation according to the third embodiment of the invention is described with reference to the flowchart in FIG. 10. This flow is started when a main power supply of a camera is turned ON, and is executed every predetermined sampling period.

Operations from step S701 to step S707 are similar to those described according to the second embodiment. Therefore, processing in step S707 and later is described in detail.

In step S707, it is judged whether the main object is detected or not in step S706. If the main object is detected, the processing goes to step S1001. If the main object is not detected, the processing goes to step S711.

In step S1001, a main object region is acquired. In this case, a ratio of a main object region in an image is acquired as described above with reference to FIGS. 8A and 8B, and the processing goes to step S1002.

In step S1002, it is judged whether the main object region acquired in step S1001 is larger than a threshold Z or not. If the main object is larger than the threshold Z, the processing goes to step S1003. If the main object is equal to or smaller than the threshold Z, the processing goes to step S708.

In step S1003, an average value of lateral magnifications in the main object region is calculated, and the processing goes to step S1004. In step S1004, a magnification correction coefficient ζ is calculated. However, in this case, takes a value of π without change, and the processing goes to step S712.

Figure 7:
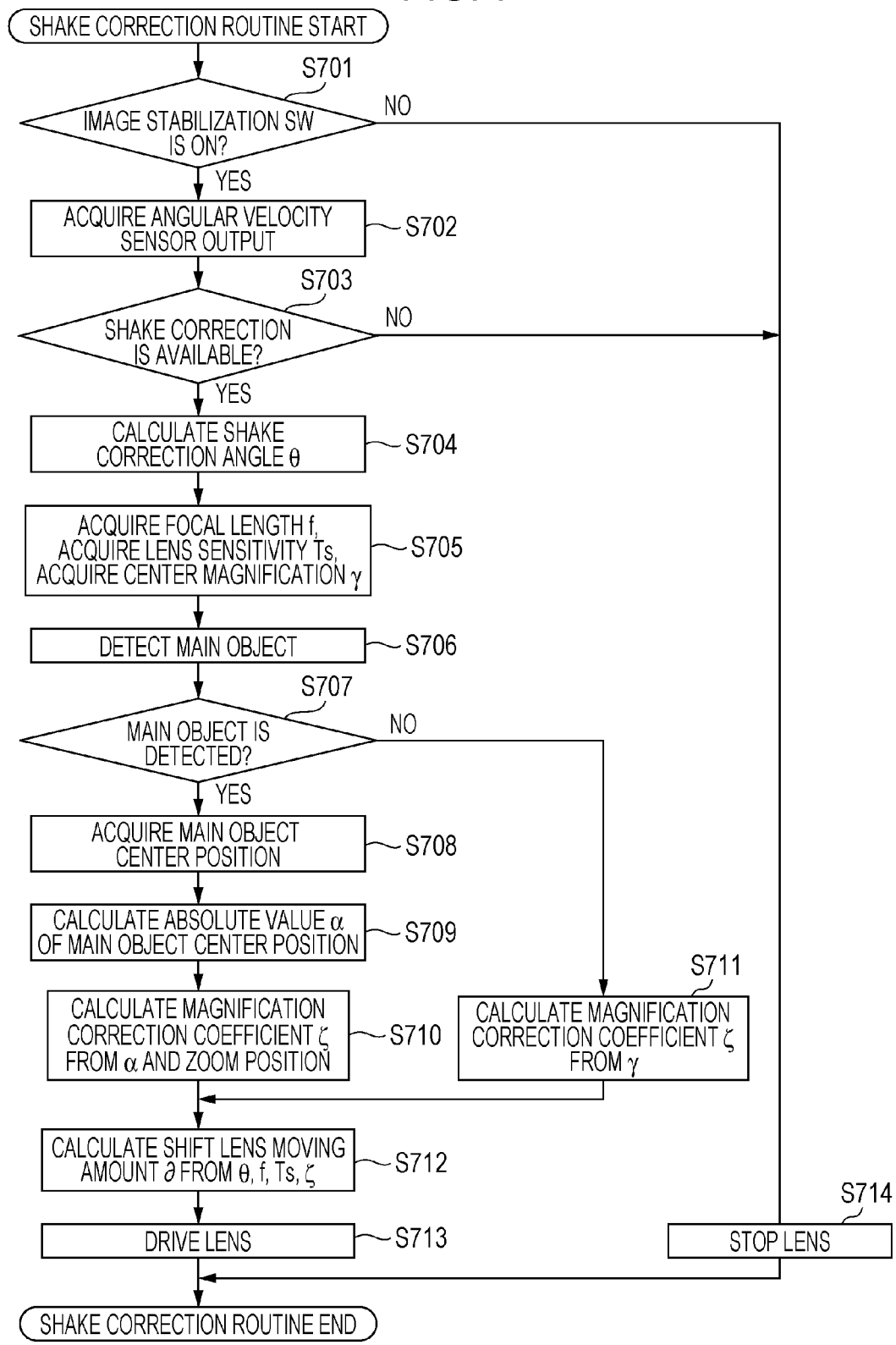
FIG. 7 is a flowchart showing an initialization operation according to the second embodiment of the invention.

Operations from step S708 to step S710 are equivalent to those in FIG. 7 according to the second embodiment. The magnification correction coefficient ζ is calculated by step S710, and the processing goes to step S712.

If the main object is not detected in step S707, the magnification correction coefficient ζ is calculated in step S711; however, in this case, takes the value of γ without change, and the processing goes to step S712.

In step S712, a shift lens moving amount ∂ is obtained from the angle θ obtained in step S704; the focal length f and the lens sensitivity Ts obtained in step S705; and the magnification correction coefficient ζ obtained in step S710, step S1004, or step S711.

The shift lens moving amount ∂ is obtained by Expression (4), and the processing goes to step S713.

In step S713, the shift lens drive controller 104 drives the shift lens on the basis of the shift lens moving amount ∂ obtained in step S712. The shake correction routine is ended and the processing waits for the next sampling period.

In step S714, the driving of the shake correction lens is stopped, and the shake correction lens is fixed at the optical-axis center. The shake correction routine is ended, and the processing waits for the next sampling period.

That is, if the size of a main object in an image pickup screen is larger than a predetermined value, image-shake correction effect is calculated on the basis of an average value of lateral magnifications in an image region of the main object in the image pickup screen.

Also, if the size of the main object in the image pickup screen is smaller than the predetermined value, image-shake correction effect is calculated on the basis of a lateral magnification at the image center of the image region of the main object in the image pickup screen.

As described above, the magnification correction coefficient ζ is calculated and the correction amount of optical image stabilization is calculated in accordance with the main-object position and the main-object size. Accordingly, stable camera shake correction effect can be obtained in the entire region of a main object in a photographed image.

The present invention can be mounted on, not only a digital single-lens reflex camera or a digital compact camera, but also any of photographic devices, such as a digital camera, a monitoring camera, a web camera, and a mobile phone.

With the invention, by optically correcting the influence of shake by deflecting a lens unit of part of an image pickup optical system, a shake correction amount of optical image stabilization is changed on the basis of a lateral magnification which is changed by distortion, and hence stable camera-shake correction effect can be obtained in an image region where shake correction is required the most.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-119997 filed Jun. 10, 2014, which is hereby incorporated by reference herein in its entirety.

What is claimed is:

1. An image-shake correction apparatus comprising:
a calculating unit configured to calculate a shake correction amount on the basis of an output of a shake detecting unit; and
a control unit configured to control an image-shake correction unit configured to correct image shake in accordance with the shake correction amount,
wherein if distortion is generated such that a screen peripheral portion of an image pickup screen of an image pickup element is reduced as compared with a screen center portion of the image pickup screen and if distortion is generated such that the screen center portion is reduced as compared with the screen peripheral portion, image-shake correction effect in the screen center portion is higher than image-shake correction effect in the screen peripheral portion.

2. An image-shake correction apparatus comprising:
a calculating unit configured to calculate a shake correction amount on the basis of an output of a shake detecting unit; and
a control unit configured to control an image-shake correction unit configured to correct image shake in accordance with the shake correction amount,
wherein a gain of a shake correction amount if distortion is generated such that a screen peripheral portion of an image pickup screen of an image pickup element is reduced as compared with a screen center portion of the image pickup screen is set to be larger than a gain of a shake correction amount if distortion is generated such that the screen center portion of the image pickup screen of the image pickup element is reduced as compared with the screen peripheral portion.

3. The image-shake correction apparatus according to claim 2, wherein the gain is a lateral magnification of a zoom lens included in an image pickup optical system.

4. The image-shake correction apparatus according to claim 3, wherein the lateral magnification is a lateral magnification at a center position in the image pickup screen.

5. A control method of an image-shake correction apparatus comprising the steps of:
a calculation step of calculating a shake correction amount on the basis of an output of a shake detecting step of detecting shake; and
an image-shake correction step of correcting image shake in accordance with the shake correction amount,
wherein if distortion is generated such that a screen peripheral portion of an image pickup screen of an image pickup element is reduced as compared with a screen center portion and if distortion is generated such that the screen center portion of the image pickup screen of the image pickup element is reduced as compared with the screen peripheral portion, image-shake correction effect in the screen center portion is higher than image-shake correction effect in the screen peripheral portion.

6. A control method of an image-shake correction apparatus comprising the steps of:
a calculating step of calculating a shake correction amount on the basis of an output of a shake detecting step of detecting shake; and
an image-shake correction step of correcting image shake in accordance with the shake correction amount, wherein a gain of a shake correction amount if distortion is generated such that a screen peripheral portion of an image pickup screen of an image pickup element is reduced as compared with a screen center portion of the image pickup element is set to be larger than a gain of a shake correction amount if distortion is generated such that the screen center portion of the image pickup screen of the image pickup element is reduced as compared with the screen peripheral portion.

* * * * *